(12) United States Patent
Johnston et al.

(10) Patent No.: US 10,086,400 B2
(45) Date of Patent: Oct. 2, 2018

(54) TRIPLE-SEAL THREADED ADAPTER FOR FLUID DELIVERY

(71) Applicant: Milspray, LLC, Lakewood, NJ (US)

(72) Inventors: Matthew L. Johnston, Bayville, NJ (US); Christian E. Steinmetz, Mickleton, NJ (US)

(73) Assignee: MILSPRAY LLC, Lakewood, NJ (US)

( * ) Notice: Subject to any disclaimer, the term of this patent is extended or adjusted under 35 U.S.C. 154(b) by 0 days.

(21) Appl. No.: 15/065,845

(22) Filed: Mar. 9, 2016

(65) Prior Publication Data

US 2017/0341104 A1    Nov. 30, 2017

Related U.S. Application Data

(63) Continuation-in-part of application No. 14/862,801, filed on Sep. 23, 2015.

(51) Int. Cl.
| | |
|---|---|
| *B43M 11/02* | (2006.01) |
| *B05C 17/035* | (2006.01) |
| *B05C 17/02* | (2006.01) |
| *F16L 25/14* | (2006.01) |

(52) U.S. Cl.
CPC ...... *B05C 17/0357* (2013.01); *B05C 17/0205* (2013.01); *B05C 17/0217* (2013.01); *B05C 17/0222* (2013.01); *F16L 25/14* (2013.01)

(58) Field of Classification Search
CPC ............ B05C 17/0357; B05C 17/0205; B05C 17/0222; B05C 17/2017; F16L 25/14
See application file for complete search history.

(56) References Cited

U.S. PATENT DOCUMENTS

| | | | | |
|---|---|---|---|---|
| 4,150,904 | A * | 4/1979 | Stewart ............... | B05C 17/0205 401/186 |
| 6,053,650 | A * | 4/2000 | Bennett ............... | B05C 17/0325 401/208 |
| 7,338,227 | B2 * | 3/2008 | Bullivant ........... | A46B 11/0013 401/208 |

* cited by examiner

*Primary Examiner* — Jennifer C Chiang
(74) *Attorney, Agent, or Firm* — Freeman Intellectual Property Law, LLC

(57) ABSTRACT

A threaded adapter device couples a liquid compound applicator, such as a paint applicator, to a liquid compound container in a liquid-tight manner, where the liquid applicator and the liquid container cannot be directly joined because they have incompatible screw-on thread configurations, but the threaded adapter device provides threads compatible with the threads of both the liquid applicator and the liquid container, as well as providing a fluid channel from the liquid container to the liquid applicator.

20 Claims, 14 Drawing Sheets

Section B-B

Detail A

Detail B

Detail C

Detail D

Detail E

Detail F

TRIPLE-SEAL THREADED ADAPTER FOR FLUID DELIVERY

CROSS REFERENCE TO RELATED APPLICATION

The present application is a continuation-in-part of patent application entitled "Roller Cap Applicator and Roller Axle," filed 23 Sep. 2015 and assigned filing Ser. No. 14/862,801, and patent application entitled "Ported Brush Applicator", filed 6 Jan. 2015 and assigned filing Ser. No. 14/589,999.

FIELD OF THE INVENTION

The present invention relates to an adapter, or coupling device, that provides a leak-proof, or liquid-tight, seal between dissimilar screw-on thread configurations in a fluid delivery system. The adapter can be used to connect a liquid compound applicator device with a threaded liquid supply feed to create a leak-proof, liquid-tight, seal.

BACKGROUND OF THE INVENTION

Threaded paint applicators that are provided with a paint supply bottle are well known in the art. Traditional threaded or screw-on or bottle-top style paint applicators and other liquid compound applicators are often compatible with only a single thread configuration. Lack of uniformity among such paint applicators thus allow for attachment primarily to only a bottle or reservoir supplied by the manufacturer of the applicator. The consumer is required to fill the manufacturer's supplied bottle with separately purchased or otherwise acquired liquid compounds. As such, the applicator itself is limited in use to only those liquid products that may be poured or transferred into the accompanying bottle or reservoir that has been supplied by the applicator's manufacturer, therefore limiting the products to which the applicator may apply.

If a consumer, or layman, or one skilled in the art, were to separately purchase a threaded bottle, or threaded container, or threaded reservoir, that contains a supply of paint or other liquid compound, with the intent of affixing such applicator to the threaded bottle, the traditional bottle-top applicator could not be mated, or used, or affixed to that separately purchased bottle unless the bottle had the same screw-on thread design, or pattern, or configuration as that of the applicator itself. For example, a 24/400 threaded bottle will accept only a 24/400 threaded bottle top applicator.

Threaded adapters, or threaded couplers, or threaded union devices are well known and may employ a variety of screw-on thread configurations. It is also well known that national and international associations have been formed to develop and standardize specific thread configurations that are common among specific industries.

For example, within the plumbing industry, thread configurations follow the National Pipe Thread (NPT) standards, whereas manufacturers of screws follow the Unified Thread Standard (UTS). Within the glass and plastic bottle industry, screw-on thread configurations follow the Glass Packaging Institute (GPI) thread standards. Among the previous examples, there exists no commonly known substitution that allows for proper connection of a screw-on thread configuration of one industry standard to be properly mated with a screw-on thread configuration of a separate industry standard.

It is also well known to one skilled in the art that a male-threaded device of a specific screw-on thread configuration may be properly mated only to an appropriately sized female-threaded device of the same screw-on thread configuration. As such, to the layman or consumer, significant difficulty lies in the identification of such mating thread configurations unless adequate information is provided that identifies the thread configuration of the products that the consumer is utilizing.

Should the consumer, or layman, or one skilled in the art, wish to unite, couple, or mount an applicator for liquid compound or paint that maintains a coupling mechanism configured as a screw-on thread configuration, and then subsequently affix the coupling mechanism to a threaded bottle, or a threaded reservoir, or a threaded fluid feed that incorporated a dissimilar screw-on thread configuration, a separate union, mounting device, adapter, or coupling apparatus might be required to make such a connection. A female screw-on threaded component that mates to a male screw-on thread configuration of the bottle, or reservoir, or threaded fluid feed would be required. The threaded component would preferably also contain an additional and different male screw-on thread configuration that mates to the female screw-on threaded component having the same configuration as that of the liquid compound, or paint, applicator.

The consumer would need to obtain information that identifies the specific screw-on thread configuration of such bottle, as well as information that identifies the specific screw-on thread configuration of such liquid compound applicator and also would require additional information identifying to the existence, and the availability, and the location or process that is required to obtain such an apparatus to be utilized as a union, mounting device, adapter, or coupling apparatus for coupling such bottle with the dissimilarly threaded liquid compound applicator.

Furthermore, unless the coupling apparatus is specifically designed or constructed to create a leak-proof, or liquid-tight seal, between the threaded fluid supply and the coupling apparatus and, unless the coupling apparatus were specifically designed or constructed to create a leak-proof, or liquid-tight, seal between the coupling apparatus and the liquid compound applicator, the resulting assembly could be susceptible to leakage of fluids during the transmittal of fluid from the threaded fluid supply, through passage of any coupling apparatus, through the liquid compound applicator, and to application onto a substrate. Should leakage occur, the user may need to further employ personal protective equipment as protection from such leaking fluids, and may need to resort to containment and cleaning methods to eradicate the undesirable and potentially hazardous leaked fluid. Furthermore, if the user is not able to successfully achieve each of the above-described requirements, attachment of the liquid compound applicator onto the bottle, reservoir, or threaded fluid feed having a dissimilar screw-on thread configuration could not be achieved.

Within the plumbing industry, there exist many devices that are designed and manufactured to allow affixment if dissimilar screw-on thread configurations. It is well known by those skilled in the trade that traditional adapters allow for the union of pipes, conduit, and other such hollow and cylindrical or tubular channels. Such adapters may also allow for the union of separate sized tubular channels such that their union may allow for continuation of the inner channel. As such, for any given screw-on thread configuration, typical adapters allow for one specific screw-on thread configuration of a tubular channel to be affixed with one specific portion of said adapter, and one secondary, or dissimilar, screw-on thread configuration of a tubular channel to be affixed with the oppositely positioned portion of the adapter.

As such, should any of the connecting threaded tubular channels be of any different diameter or thread configuration, that specific adapter could not be utilized, thus a different adapter must be used. For example, a plumber may install a significant length of threaded water pipe. If the plumber chooses to utilize 0.7500 inch internally threaded water pipe for one portion of that length, and then utilize 0.5000 inch externally threaded water pipe for the remaining portion of that length, he may utilize a reducer, or union-connection between the two dissimilar pipes to allow continuation of water through those pipes. As such, a union-connection may contain an internally threaded portion about the inner circumference of such union-connector along one half of its length to accept the insertion of the smaller 0.5000 inch threaded pipe within that union-connector, as well as containing an external threaded portion about exterior circumference along one half of its opposite length to allow insertion within larger 0.7500 inch internally threaded pipe. Typically, such union-connector may have a larger girth, or diameter about its portion of length that contains the internal threads; likewise, such union connector may have a smaller girth, or diameter, about its portion of length that contains the external threads. In such example, should the exteriorly threaded pipe be slightly smaller in diameter or slightly larger in diameter, that specific reducer, or union-connection, could not be utilized because the diameter of the pipe had changed and therefore that specific union-connection connection would now be of dissimilar size as that of the pipe.

Other forms of screw-on threaded adapters, or unions, or couplers, exist in the form of cylindrical devices containing a cylindrical channel through its length, such as an internally threaded and externally threaded pipe. Such adapters (i) employ an exterior thread about the circumference of its length; and (ii) employ an interior thread about the length and circumference of its interior wall. As such, these are of unidirectional affixment whereas one smaller diameter thread is positioned concentrically within the interior, whilst one larger diameter thread is positioned concentrically about its exterior.

Commonly available are such devices that are insufficient in length to accommodate retrieval from within female-threaded cavities, or are of common thread configurations as those used within the machining industry, commonly referred to as machine threads, and not commonly found in standard bottle nor container industry; such threads are commonly referred to as GPI threads. Should one skilled in the art discover readily available devices such as described, wherein such thread configuration may allow for such device to be thread-mated, wherein the exterior threads, or male-threads, may be inserted within the female-threaded cavity of the liquid compound applicator, and then subsequently the inner threads of such device could be mounted about the male-threaded portion of a thread-mated bottle, reservoir, or fluid feed, such coupling device would have the shortcoming of an insufficient length to allow ease of extraction or retrieval from the female-threaded cavity of the liquid compound applicator. More so, such devices are not known to feature GPI Standard threads, such as those employed on standard liquid compound applicator bottles.

Furthermore, in such examples, should the thread configuration of the bottle, reservoir, or fluid feed change in configuration, or in diameter, such as to employ a different fluid source, the threaded coupling device as described cannot be utilized with the now-dissimilar thread configurations. Furtherly more, such threaded coupling device, unless specifically designed, or constructed, to create a leak-proof, or liquid-tight seal, between a threaded fluid supply and a coupling apparatus, and unless specifically designed, or constructed, to create a leak-proof, or liquid-tight, seal between such coupling apparatus and the affixed liquid compound applicator, would most likely be susceptible to leakage of the fluid during the transmittance of the fluid from the threaded fluid supply, during passage of the fluid through a coupling apparatus, during passage through a liquid compound applicator, and ultimately to a substrate. Should leakage occur, an operator of such device configuration would need to employ personal protective equipment for protection from the resulting leaking fluid and must further employ containment and cleaning methods to eradicate such leaked fluid.

The cleaning of, or removal of liquid compounds from such applicators is well-known in the art. The process is a difficult task that typically employs buckets, or sinks, or other type of liquid holding container to which water or other liquid solvent is dispensed for the purpose of flushing, or irrigating, or dissolving such liquid compound from an applicator. Typically, as the cleaning process is time-intensive, messy, and often times, one performing a cleaning task may opt to discard a previously utilized liquid compound applicator instead of taking the steps of cleaning the soiled applicator.

What is needed is an adapter, a union, or a coupling device of cylindrical form or multitude of adjoined cylindrical forms that: (i) maintains a continuation of path for fluid flow internally throughout its length; (ii) maintains an internal threaded cavity about one end portion of the length of the device, wherein the internal thread (female thread) configuration is in compliance with one standard bottle thread of the GPI thread specifications; (iii) maintains an internal threaded cavity about one oppositely positioned end portion of the length of the device, wherein the internal thread (female thread) configuration is in compliance with one standard bottle thread of the GPI thread specifications that may be dissimilar that the oppositely positioned internal thread; (iv) maintains an external thread (male thread) about the exterior of the device's cylindrical form in accordance with the thread configuration commonly referred to as 24-410 or 24/410 as identified by GPI thread specification about the length of the device, wherein such thread may be continuous about the length, or a portion of the length of, the exterior of such form; (v) such device creates a leak-proof, or water-tight, seal upon proper insertion or connection to a properly thread-mated liquid compound applicator; and (vi) such device creates a leak-proof, or water-tight, seal upon coupling with a properly thread-mated fluid supply.

What is also needed is an adapter or variation of an adapter maintaining the connectivity to threaded fluid feeds for which such fluid feed maintains a larger thread diameter than the applicator that allows connectivity between an applicator consisting of GPI 24-410 female threads and a fluid feed maintaining a screw-on thread of a larger diameter than that of the applicator itself. For example, paint bottles with a larger threaded opening, or mouth diameter, than that of the threaded portion of the applicator imposes a separate issue than one in which the bottle opening is smaller, in that, with reference to the applicator itself, a coupling device needs to employ an expanded diametrical region to accept the larger diameter threaded opening of the larger bottle. Within this example, what is needed is a coupling device with the aforementioned features that also may employ a wider threaded portion to accept coupling with a larger threaded bottle diameter than that of the applicator.

What is also needed is an adapter to connect the paint applicator to a fluid feed that supplies water or other solvent, such as a garden hose or utility hose, to enable a sufficient supply of solvent fluid through the applicator for flushing liquid compound from the applicator assembly to enable cleaning of and future reutilization of such applicator.

BRIEF SUMMARY OF THE INVENTION

The present invention is a substantially cylindrical, hollow threaded adapter having an outer male threaded section, at least one inner female threaded section, and at least one inner sealing feature configured as a circular V-shaped groove, for attaching a supply of a liquid compound to an applicator.

In one aspect of the present invention, an adapter suitable for attachment to a paint applicator comprises: a substantially cylindrical body having a fluid channel extending through the cylindrical body; a male thread formed on an outer surface of the cylindrical body, the male thread configured for removable attachment to the paint applicator; a first female thread extending into the fluid channel from a first end of the cylindrical body; a second female thread extending into the fluid channel from a second end of the cylindrical body; and a transfer channel extending between the first female thread and the second female thread so as to form the fluid channel.

In another aspect of the present invention, an adapter suitable for attachment to a paint applicator comprises: a substantially cylindrical body having a fluid channel extending through the cylindrical body; a male thread formed on an outer surface of the cylindrical body, the male thread configured for removable attachment to the paint applicator; a female thread extending into the fluid channel from a first end of the cylindrical body; and a transfer channel extending between the female thread and an opening in a second end of the cylindrical body so as to form the fluid channel.

In yet another aspect of the present invention, a roller liquid compound applicator suitable for use in the application of a liquid compound onto a surface comprises: a U-shaped roller support frame having opposed L-shaped support frame arms connected to a dispenser coupling cap having a first female thread; a drip guard on the dispenser coupling cap having a concave upper guard surface; a liquid compound roller sleeve disposed between the opposed L-shaped support frame arms and adjacent to the drip guard; and an adapter having (i) an external male thread for releasable attachment of the adapter to the first female thread, (ii) a second female thread for releasable attachment to a first threaded bottle, (iii) a third female thread for releasable attachment to a second threaded bottle, and (iv) a transfer channel extending between the second female thread and the third female thread to form a fluid channel extending through the adapter, the fluid channel functioning to enable passage of the liquid compound from one of the threaded bottles to the liquid compound roller sleeve.

The additional features and advantages of the disclosed invention is set forth in the detailed description which follows, and will be apparent to those skilled in the art from the description or recognized by practicing the invention as described, together with the claims and appended drawings.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which.

DETAILED DESCRIPTION OF THE INVENTION

Figure 1:
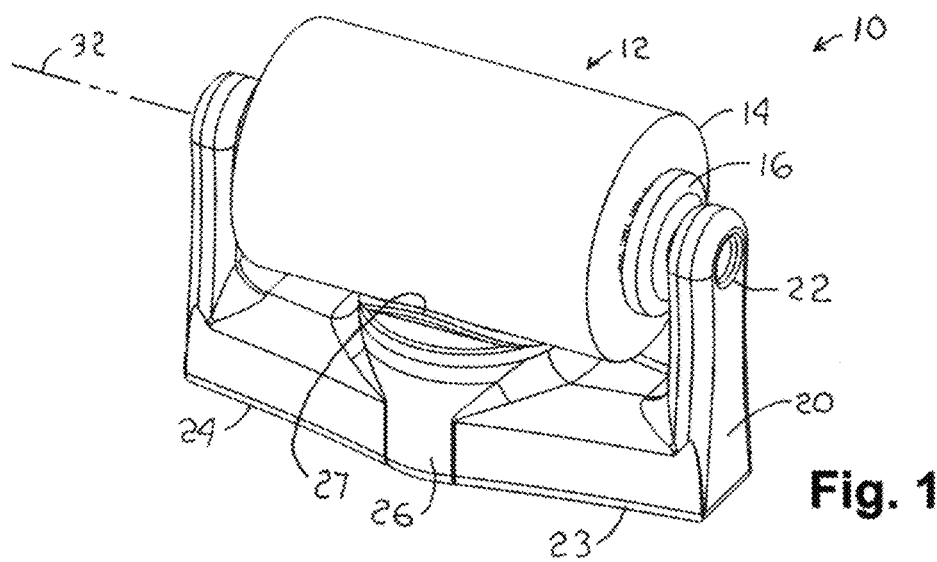
FIG. 1 is an isometric illustration of a roller liquid compound applicator including a roller support frame and a roller axle with a liquid compound roller sleeve, in accordance with the present invention.

The following detailed description is of the best currently contemplated modes of carrying out the invention. The description is not to be taken in a limiting sense, but is made merely for the purpose of illustrating the general principles of the invention.

Disclosed herein is a dual-seal threaded component functioning as an adapter for fluid delivery configured for use with a roller liquid compound applicator. In a typical application, the adapter is affixed onto a liquid supply container having a threaded neck, preferably a flexible walled plastic bottle. The liquid compound is transferred to a rotatable cylindrical form on a free-moving axle on the roller liquid compound applicator that is, in turn, attached to a dispenser coupling cap. The liquid compound is further transferred to a surface or substrate by direct contact of the cylindrical form to the surface or substrate. Greater areas of paint coverage upon such surface are typically achieved by means of traversing the surface with the liquid compound paint-saturated rotatable surface, commonly referred to as "rolling" the paint upon such surface.

The roller liquid compound applicator includes at least two fluid port openings, and at least one distribution channel forming a shallow cavity in the paint roller fixture joining each fluid port opening. The one or more distribution channels intersect the fluid port openings to physically contain liquid compound pooling between the fluid port openings. A liquid compound reservoir is contained within the dispenser coupling cap of the roller assembly; and includes a drip guard for the determent of liquid compound paint drippage from the roller fixture.

The roller liquid compound applicator may be attached to a threaded bottle of compatible thread size which has been previously filled with paint or other liquid. In an exemplary embodiment, the roller liquid compound applicator may contain systematic beveled protrusions or angular segments about the circumference of the inner wall of the threaded portion, or dispenser coupling cap, that create primary and secondary seals, respectively, about the outer edge of the upper rim of the neck of the bottle, and about the inner edge of the upper rim of the neck of the bottle respectively. The angular beveled protrusions or angular segments located in the base of the dispenser coupling cap function to create liquid-tight seals when used with the disclosed dual-seal threaded adapter on bottles or containers of different thread configurations.

An additional aspect of the present invention is the transfer, or transmission, of liquid compound from a bottle that contains the liquid compound, via a liquid compound conveyance path. In an exemplary embodiment, the liquid compound conveyance path comprises: (i) a liquid conduit contained within the base of a dispenser coupling cap, (ii) a liquid reservoir in fluid communication with the liquid conduit, (iii) at least two liquid compound flow ports in fluid communication with the liquid reservoir, and (iv) a liquid compound distribution channel in fluid communication with the liquid compound flow ports and with the roller liquid compound applicator. The reservoir accumulates liquid compound paint that was transferred from the bottle, and further enables the liquid compound to enter into the fluid ports that extend from the liquid reservoir and to a surface adjacent the roller pad surface. This liquid compound distribution channel aids in the even distribution of paint across the roller liquid compound applicator. In the event that a port becomes "clogged," and does not function to bring the liquid compound to the concave surface, the distribution channel will allow sufficient paint to travel to the clogged side of the roller promoting an even dispersal of paint to the roller form.

The roller liquid compound applicator advantageously includes anti-drip guards, formed at the exit ports and continuing upward and outward as to maintain close proximity to, but not interfering with, the roller form. The purpose of the anti-drip guards is to prevent the liquid compound from dripping from the ports, by ensuring that the ports directly contact the absorbing material of the roller form. The close proximity of the anti-drip guards also ensures that excessive quantities of paint do not accumulate on a portion of the roller form at a single time by limiting the volume of space the excess paint may occupy.

There is shown in FIG. 1 a perspective view of a roller liquid compound applicator 10 comprising a liquid transfer roller assembly 12 removably secured in a roller support frame 20. The roller support frame 20 is generally U-shaped comprising opposed L-shaped support frame arms 23, 24, both support frame arms 23, 24 connected to a dispenser coupling cap 26. A drip guard 27 on the dispenser coupling cap 26 has a concave upper guard surface 33 (shown in FIG. 2) substantially matching, or conforming to, the convex cylindrical curvature of a liquid compound roller sleeve 14, as explained in greater detail below.

The liquid compound roller sleeve 14 is installed in the liquid transfer roller assembly 12 by sliding onto a roller axle 16. The liquid compound roller sleeve 14 may comprise a sponge or a similar type of porous, absorbent, or wicking material to aid in temporarily retaining liquid compound on the roller assembly 12 for subsequent transfer to a target surface. The roller axle 16 has opposed ends configured to fit into respective axle retaining holes 22 in the L-shaped support frame arms 23, 24. The roller support frame 20 may be fabricated from a rigid but flexible material, such as a plastic, e.g., polypropylene, so as to allow installation and removal of the liquid transfer roller assembly 12 by flexing apart the support frame arms 23, 24 to allow removal from the axle retaining holes 22.

Figure 2:
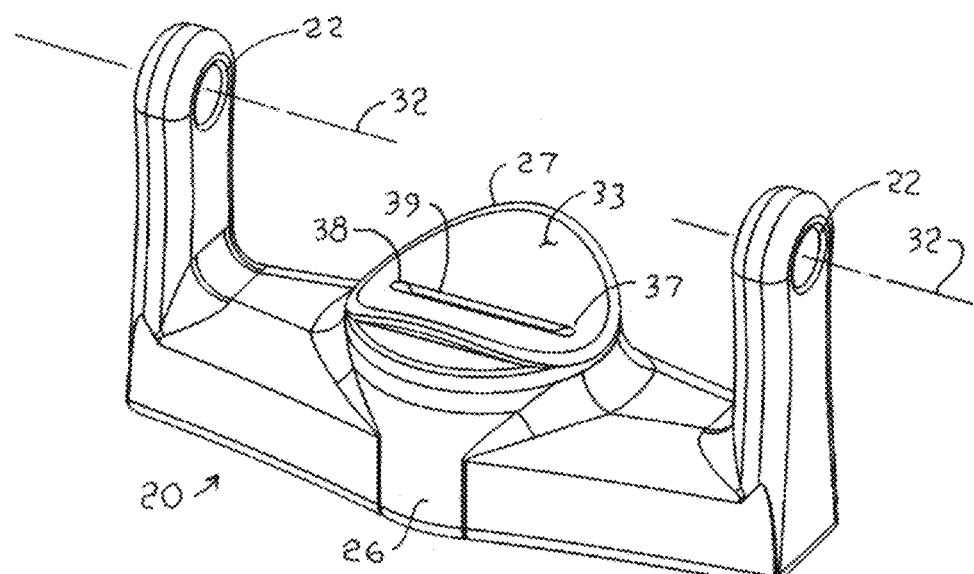
FIG. 2 is an isometric illustration of the roller support frame of FIG. 1.

FIG. 2 shows an isometric perspective view of the roller support frame 20 to illustrate that, when the liquid transfer roller assembly 12 is mounted into the roller support frame 20, the liquid transfer roller assembly 12 is free to rotate about a longitudinal roller axis 32. The support frame arms 23, 24 are preferably formed with, or bonded to, the dispenser coupling cap 26 such that the longitudinal roller axis 32 passes through the centers of the respective axle retaining holes 22. The circular cylindrical shape of the concave upper guard surface 33 of the drip guard 27 provides a large surface area with which to catch possible compound drips from the liquid compound roller sleeve 14.

A liquid compound distribution channel 39 is recessed within the concave upper guard surface 33, in FIG. 2. A first liquid compound flow port 37 and a second liquid compound flow port 38 are open and terminate at respective ends of the liquid compound distribution channel 39. It should be understood that two or more liquid compound distribution channels, and additional liquid compound flow ports, may be provided in the concave upper guard surface 33, but only one liquid compound distribution channel and only two liquid compound flow ports are shown for clarity of illustration.

Figure 3:
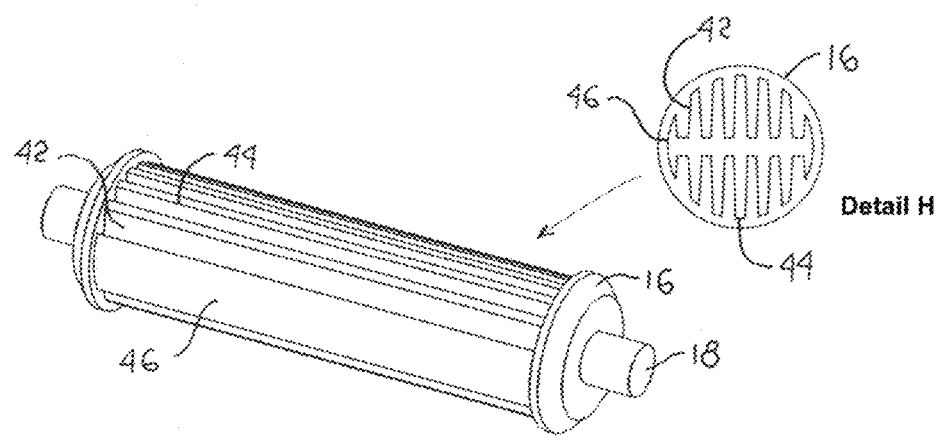
FIG. 3 is an isometric illustration of the roller axle of FIG. 1 without the liquid compound roller sleeve, and a cross-sectional view of the roller axle.

FIG. 3 is an isometric perspective view of the roller axle 16 with the liquid compound roller sleeve 14 of FIG. 1 removed. A plurality of longitudinal center slats 42 are laterally spaced from one another on a central cylindrical core 18. End slats 46 have rounded surfaces. The longitudinal center slats 42 have outer rounded edges 44 that, in conjunction with the rounded surfaces of the end slats 46, ensure a smooth roll out of paint or other liquid, while frictionally retaining the liquid compound roller sleeve 14 on the roller axle 16, as also shown in the cross-sectional view of Detail H. The central cylindrical core 18 is sized so as to be rotatably retained in the axle retaining holes 22.

Figure 4:
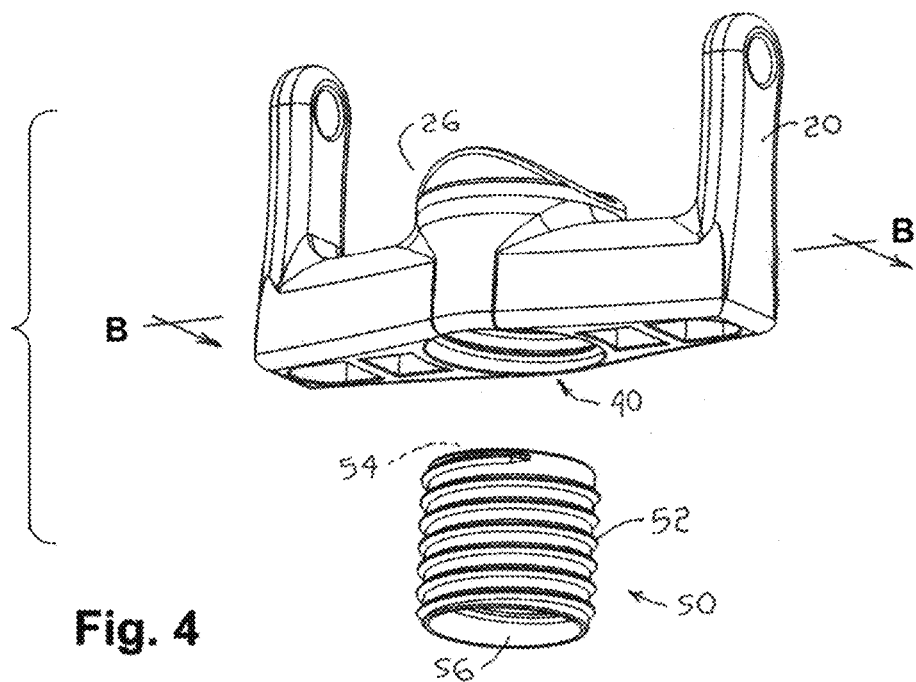
FIG. 4 is an isometric illustration of the roller support frame of FIG. 1 with a bi-directional adapter, in accordance with an aspect of the present invention.

FIG. 4 is a perspective view of the roller support frame 20 shown with a bi-directional adapter 50. The bi-directional adapter 50 is a substantially cylindrical body that includes an interior fluid channel to allow the flow of the liquid compound, as explained in greater detail below. The bi-directional adapter 50 includes external, male threads 52, having a substantially triangular thread cross section, arranged helically around the outer diameter of the bi-directional adapter 50, enabling mating with and removable attachment to a threaded cavity 40 in the dispenser coupling cap 26 of the roller support frame 20, as shown in sectional view FIG. 5. The external threads 52 extend along the entire length of the surface of the cylindrical body of the bi-directional adapter 50 for approximately 3.5 revolutions so as to allow either end of the bi-directional adapter 50 to be mated with the threaded cavity 40, as described in greater detail below. In an exemplary embodiment, the external threads 50 may have a pitch of about 3.175 mm, and about a 22.0 mm diameter. The height of the bi-directional adapter 50 may be about 22.0 mm.

In general, the bi-directional adapter 50 may include: (i) male threading of larger diameter to accommodate a paint applicator such as a brush or roller, (ii) a first smaller diameter female thread extending into the fluid channel from a first end of the cylindrical body of the bi-directional adapter 50, (iii) a second smaller diameter female thread extending into the fluid channel from a second end of the bi-directional adapter 50, and (iv) an internal flange or ridge to provide a sealing feature by pressing against the inside of a bottle neck of supply container onto which the bi-directional adapter 50 is being placed. The internal flange feature secures a seal between the bi-directional adapter 50 and the bottle neck. In an exemplary embodiment, the flange feature will have an inner diameter slightly smaller than the bottle neck inner diameter and an outer diameter slightly wider than the outer diameter of the bottle neck. When used in conjunction with the inner threading, the internal flange is pressed tightly onto the bottle neck creating the sealing feature and negating the need for a washer.

Accordingly, the bi-directional adapter 50 can be attached to the roller support frame 20 using the external threads 52 by inserting either a first end 54 into the threaded cavity 40, as shown in the illustration, or by reversing the bi-directional adapter 50 and inserting a second end 56 into the threaded cavity 40, as explained in greater detail below. When the second end 56 of the bi-directional adapter 50 is inserted into the dispenser coupling cap 26, the user has access to a first internal female thread 74 for mating with a bottle neck of a first thread size. The diameter of the first female thread 74 is less than the diameter of the external threads 52, but greater than the diameter of a transfer channel 78. In an exemplary embodiment, the first female thread 74 may be triangular in cross section and about 15.00 mm in diameter, with a depth of about 7.00 mm, and a thread pitch of about 1.50 mm for about 3.5 turns.

When the first end 54 of the bi-directional adapter 50 is inserted into the dispenser coupling cap 26, as can be understood from the illustration, the user has access to a second internal female thread 76 for mating with a bottle neck of a second thread size. The diameter of the second female thread 76 is less than the diameter of the external threads 52, and greater than the diameter of the transfer channel 78. In an exemplary embodiment, the second female thread 76 may be rhomboid in cross section, about 20.50 mm in diameter, with a depth of 12.00 mm, and a thread pitch of about 4.00 mm for about 2.0 turns.

Figure 5:
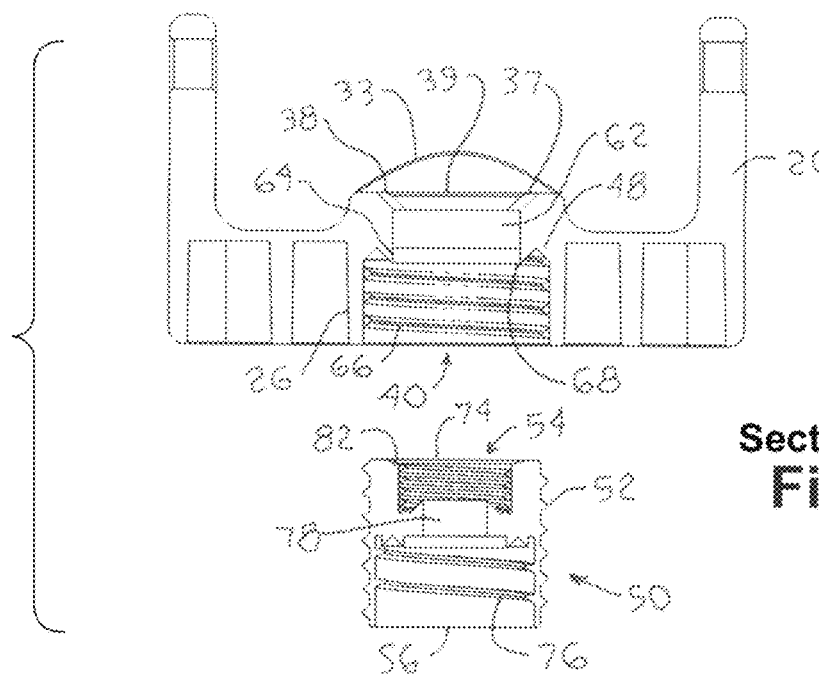
FIG. 5 is a front cross-sectional view of the roller support frame and the bi-directional adapter of FIG. 4.

As best seen in FIG. 5, the first liquid compound flow port 37 and the second liquid compound flow port 38 are disposed at opposite ends of the liquid compound distribution channel 39. The first liquid compound flow port 37 and the second liquid compound flow port 38 separately open into a cylindrical liquid conduit 62 in the dispenser coupling cap 26 of the roller support frame 20. The liquid conduit 62 serves as a pathway for paint or a liquid to flow from the cylindrical threaded cavity 40. Internal threads 66 in the dispenser coupling cap 26 are formed on, or are part of, the interior wall of the threaded cavity 40.

Figure 6:
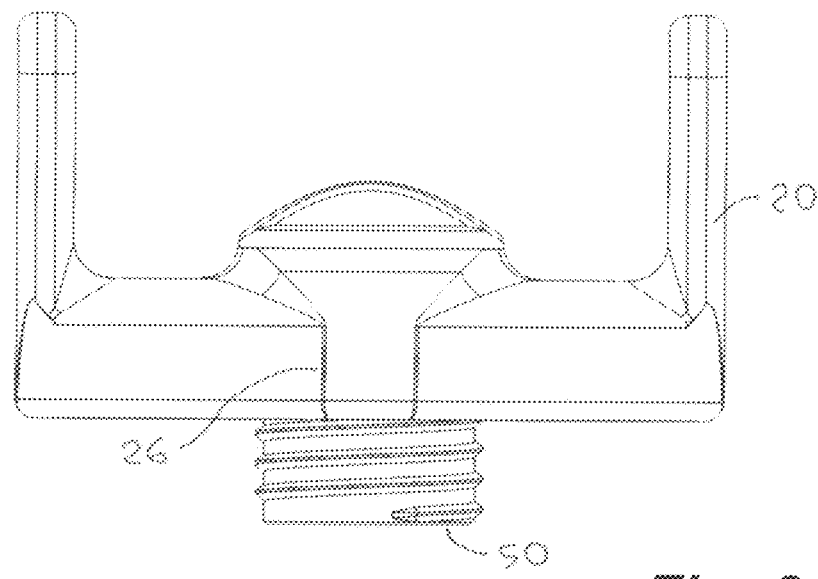
FIG. 6 is an elevational view of the roller support frame and the bi-directional adapter of FIG. 4, as assembled in accordance with an aspect of the present invention.
Figure 7:
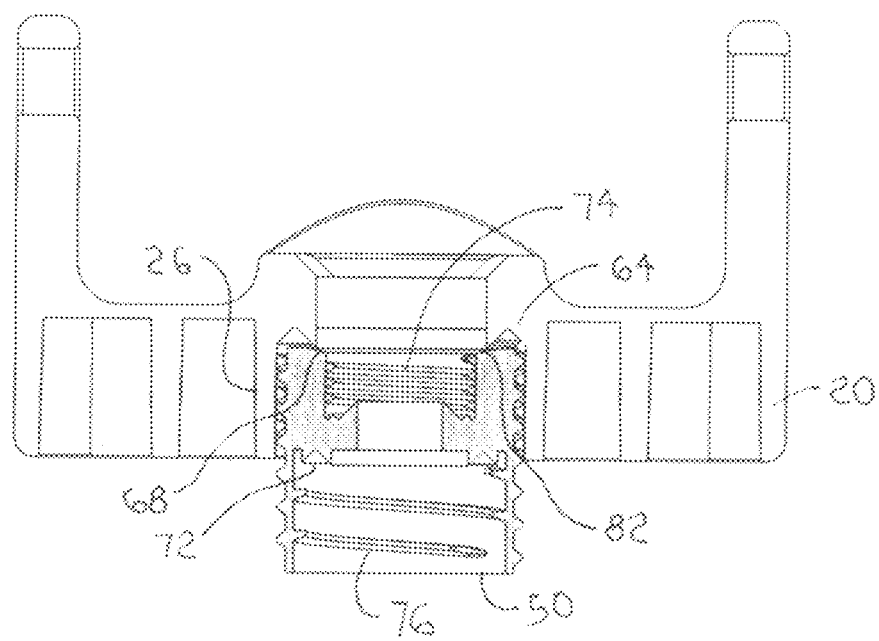
FIG. 7 is a section view of the roller support frame and bi-directional adapter of FIG. 6.

The internal threads 66 preferably terminate at a sealing feature that includes a circumferential groove 48 in the upper interior portion of the threaded cavity 40. A conical rim surface 82 (e.g., a countersink) in the bi-directional adapter 50 bears against a circumferential groove rim 68 adjacent the circumferential groove 48 when the bi-directional adapter 50 is fully inserted into the threaded cavity 40 within the dispenser coupling cap 26, as shown in FIG. 6 and in the cross-sectional view of FIG. 7. The bi-directional adapter 50 has a first substantially circular, V-shaped groove 64 forming a seal at the terminus of the first female thread 74 has a second substantially circular, V-shaped groove 72 forming a seal at the terminus of the second female thread 76. Both the first V-shaped groove 64 and the second V-shaped groove 72 function to form a leak-proof interface when a liquid compound bottle (not shown) has been threaded into either end of the bi-directional adapter 50.

In the disclosed configuration, annular or conical surfaces function to create this sealing effect. One conical surface is a first ridge that seals along the inner circumference of the liquid compound bottle. A second, conical surface, is a second ridge that seals along the outer circumference of the liquid compound bottle. Another, substantially annular surface, is the central portion of the V-shape seal where portions of the first and second ridges seal off the top, flat portion of the rim of the liquid compound bottle. As can be appreciated by one skilled in the art, the bi-directional adapter 50 may be fabricated from a flexible plastic such as polyethylene. When a liquid compound bottle is secured into the bi-directional adapter 50, the flexible plastic at the first ridge surface and the flexible plastic at the second ridge surface may deform slightly upon tightening of the liquid compound bottle within the bi-directional adapter 50. This deformation action causes the respective V-shaped seal to deform against the flat annular surface of the rim of the liquid compound bottle and form yet another sealing region.

Figure 8:
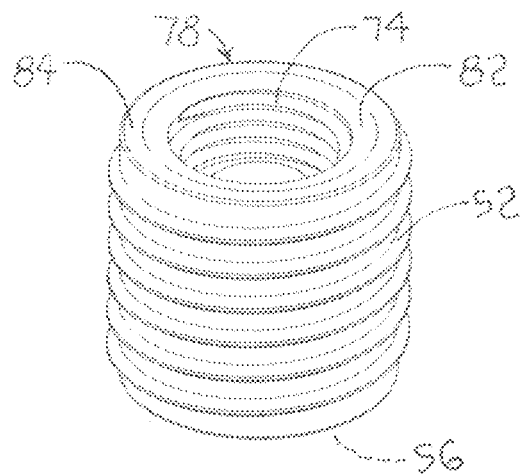
FIG. 8 is an enlarged isometric view of the bi-directional adapter of FIG. 4.
Figure 9:
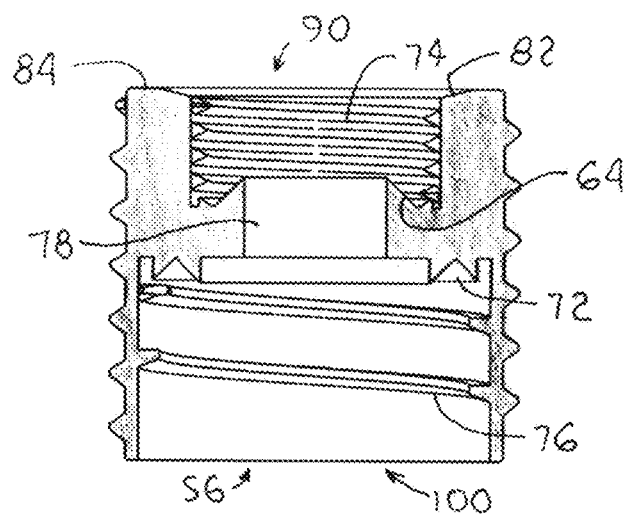
FIG. 9 is a cross section view of the bi-directional adapter in FIG. 8.

The truncated conical rim surface 82 of the bi-directional adapter 50 is a substantially concave surface in the bi-directional adapter 50, sloping inwardly, from a substantially flat top surface annulus 84 to the first female thread 74 at the first end 54 of the bi-directional adapter 50, as shown in FIGS. 8 and 9. The conical rim surface 82 aids in creating a seal with the dispenser coupling cap 26. The conical rim surface 82 is required only if the first female thread 74 features a diameter less than or equal to 16.500 mm.

FIG. 9 shown the bi-directional adapter 50 with the first V-shaped groove 64 and the second V-shaped groove 72 that provide secure seals when attaching the bi-directional adapter 50 to the respective bottle neck. Preferably, the V-shaped grooves 64, 72 are sized so as to have outer diameters wider that the diameter of the respective mating bottle neck, and the inner diameters smaller than the inside diameter of the mating bottle neck, while having a 45-degree slope or bevel to form the V-shaped groove. It can be appreciated that the V-shaped groove 64 is disposed to enclose a first end of the transfer channel 78, and the V-shaped groove 72 is disposed to enclose a second end of the transfer channel 78.

In an exemplary embodiment, the side walls of the V-shaped grooves 64, 72 are sloped at 45-degree angles, to form 90-degree grooves. The V-shaped groove 72 may be about 1.50 mm tall, about 1.50 mm wide, and may have an inner diameter of about 13.25 mm. The V-shaped groove 64 may be about 2.00 mm tall, about 2.00 mm wide, and may have an inner diameter of about 8.25 mm. The bi-directional adapter 50 further includes the first female thread 74 extending into the fluid channel from the first mating opening 90, and the second female thread 76 extending into the fluid channel from the second mating opening 100 for a liquid compound container threaded neck 110, shown in FIG. 11.

The transfer channel 78 provides an opening for the passage of liquid compound between the first mating opening 90 at the first end 54, and the second mating opening 100 at the second end 56, as in FIG. 9. The first female thread 74, the transfer channel 78, and the second female thread 76 form a fluid channel through the cylindrical body of the bi-directional adapter 50. The fluid channel allows for the transfer of fluid from the threaded supply bottle (not shown) into the dispenser coupling cap 26 and to the liquid compound roller sleeve 12. Preferably, the diameter of the transfer channel 78 is the same as the smaller of the inner diameters of the V-shaped groove 64 and the V-shaped groove 72, so as to allow for maximum fluid flow. The channel may taper, if desired, from the inner diameter of the V-shaped groove 64 to the inner diameter of the V-shaped groove 72. In an exemplary embodiment, the transfer channel 78 may be of a cylindrical shape with a diameter of about 8.25 mm.

Figure 10:
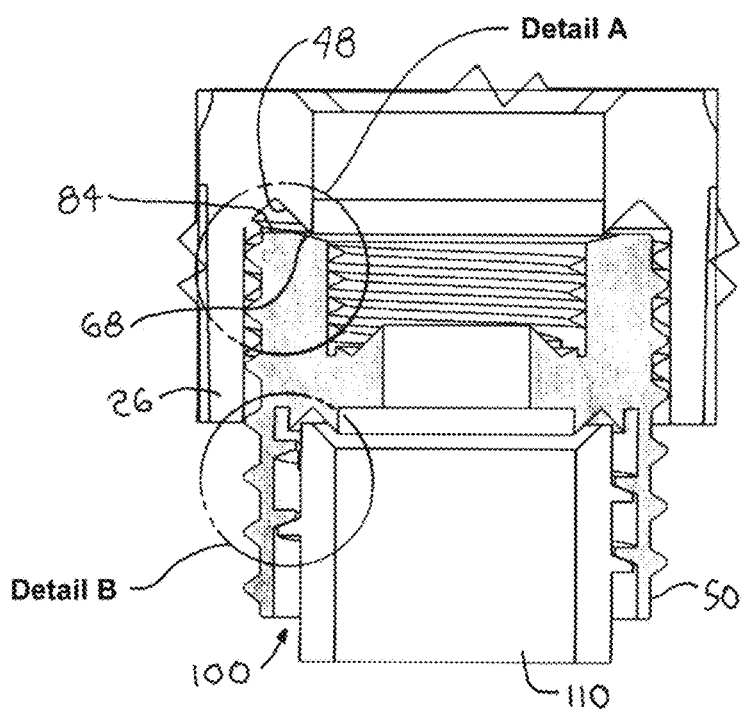
FIG. 10 is a section view of the roller support frame and bi-directional adapter of FIG. 7 with the threaded neck of a Tulip brand paint bottle.
Figure 11:
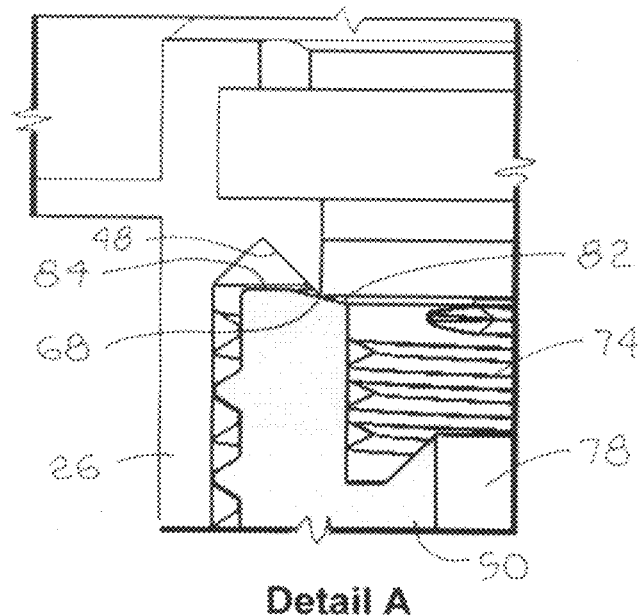
FIG. 11 is a detail view of a conical rim surface and a circumferential groove in the bi-directional adapter of FIG. 10.

FIG. 10 is a magnified cross-sectional view of the bi-directional adapter 50 as inserted into the dispenser coupling cap 26. The threaded neck 110 of a TULIP brand paint bottle has been inserted into the second mating opening 100. FIG. 11 is a magnified cross-sectional view of the bi-directional adapter 50 wherein the conical rim surface 82 is bearing against the circumferential groove rim 68 in the dispenser coupling cap 26. The geometry of the conical rim surface 82 allows the flat top surface annulus 84 of the bi-directional adapter 50 to protrude into the circumferential groove 48. This configuration provides a sealing feature at the interface of the conical rim surface 82 and the circumferential groove rim 68, and serves to prevent leakage into the circumferential groove 48 of the paint or other fluid flowing from the transfer channel 78. This illustration emphasizes the interaction between the conical rim surface 82 and the circumferential groove rim 68 of the dispenser coupling cap 26. When the bi-directional adapter 50 is threaded into the dispenser coupling cap 26, the conical rim surface 82 is pressed against the circumferential groove rim 68 and flexes slightly inward as allowed by the manufacturing material used for the roller support frame 20 and provides a secure seal with the bi-directional adapter 50.

Figure 12:
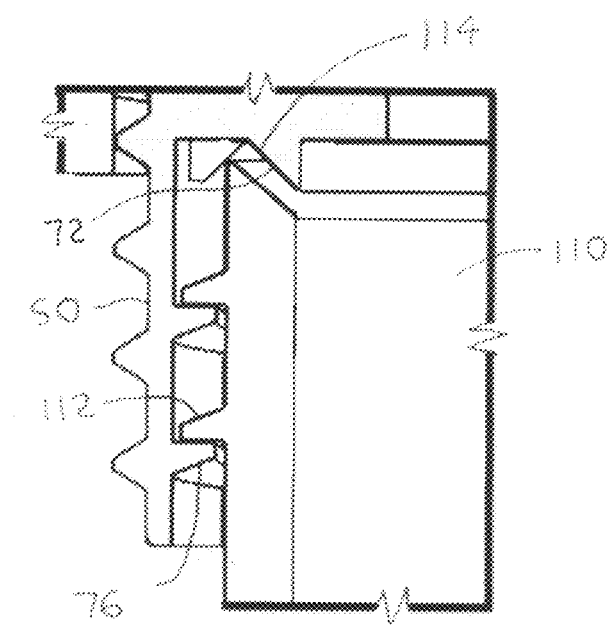
FIG. 12 is a detail section view of the bi-directional adapter interaction with the sealing flange in the roller support frame of FIG. 10.

As shown in the Detail A view of FIG. 12, threads 112 on the liquid compound container threaded neck 110 are secured onto the second female thread 76. An inside bottle rim surface 114 bears against the V-shaped groove 72 of the bi-directional adapter 50. This illustration emphasizes the interaction of the threading as well as the V-shaped groove 72 of the bi-directional adapter 50 with the TULIP brand paint bottle threaded neck 110. When fastened, the orifice of the paint bottle is pressed against the V-shaped groove 72 and is flexed slightly outward, providing a secure seal for fluid flow.

Figure 13:
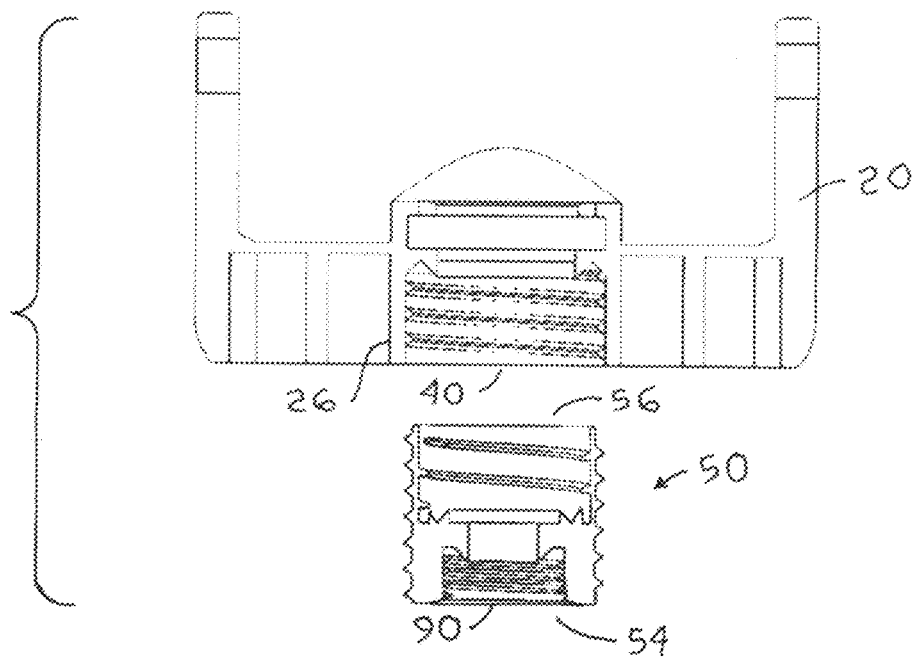
FIG. 13 is a section view of the roller support frame and bi-directional adapter of FIG. 4 with the bi-directional adapter in an inverted orientation.

The bi-directional adapter 50 is configured to be used in a second orientation to the roller support frame 20. By reversing the bi-directional adapter 50 end-for-end, and inserting the second end 56 into the threaded cavity 40 in the dispenser coupling cap 26, the bi-directional adapter 50 provides access to the first mating opening 90 at the first end 54, as shown in FIG. 13. The first mating opening 90 is configured to mate with the threaded neck of a bottle or container different from a container having a threaded neck that is configured to mate with the second mating opening 100, described above.

Figure 14:
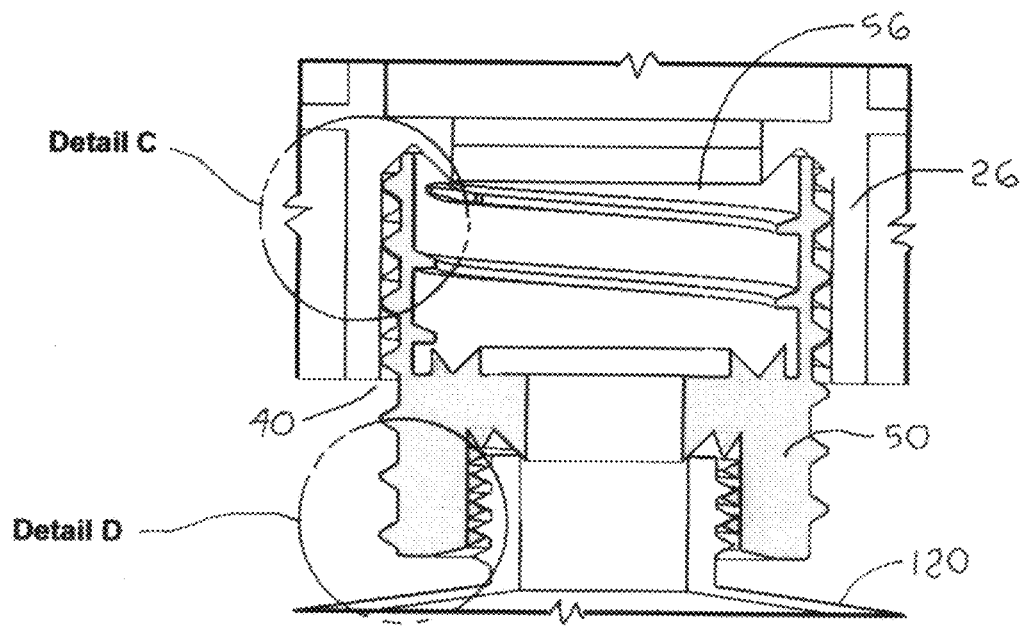
FIG. 14 is an enlarged view of the roller support frame and bi-directional adapter of FIG. 13 in an assembled state with the bi-directional adapter in the inverted orientation.
Figure 15:
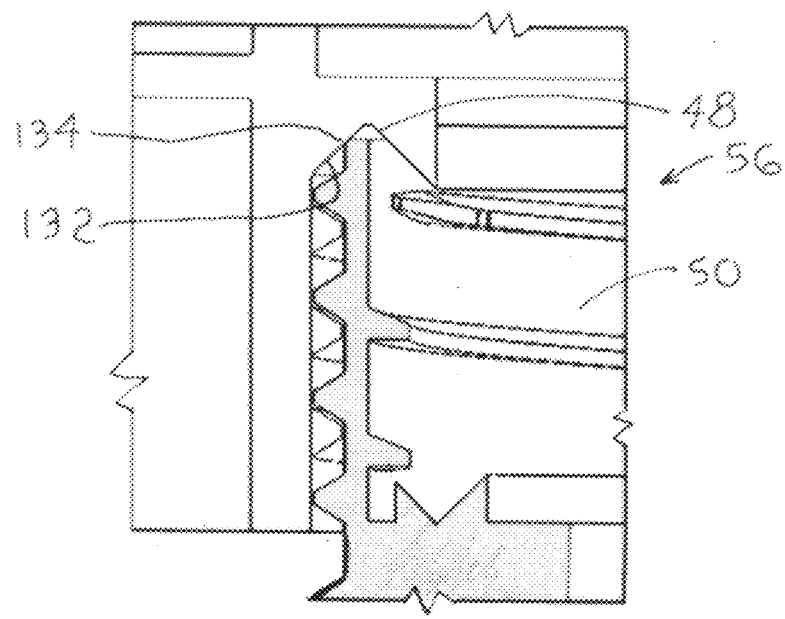
FIG. 15 is a detail view of an outside circumferential edge and a circular conical surface in the roller support frame and bi-directional adapter of FIG. 14.
Figure 16:
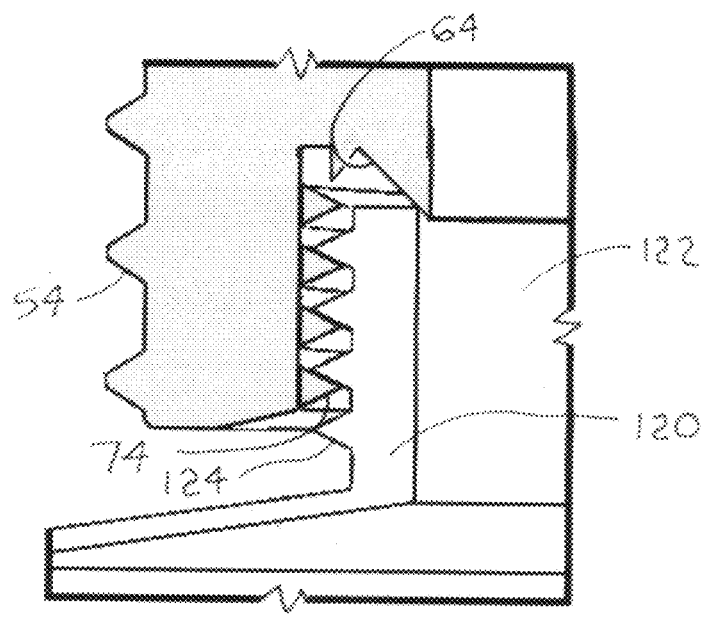
FIG. 16 is a detail view of an internal adapter flange in the roller support frame of FIG. 14.

FIG. 14 is an enlarged view of the second end 56 of the bi-directional adapter 50 secured within the threaded cavity 40 of the dispenser coupling cap 26, with a threaded neck 120 of a paint bottle such as may be marketed by Martha Stewart. Detail C, in FIG. 15, is a cross-section of the interaction of the inverted bi-directional adapter 50 with an outside circumferential edge 134 of the second end 56 of the bi-directional adapter 50 with a circular conical surface 132 in the threaded cavity 40 of the dispenser coupling cap 26. The outside circumferential edge 134 of the bi-directional adapter 50 contacts the circular conical surface 132 in the dispenser coupling cap 26 and is compressed inward slightly forming a secure sealing feature for fluid flow. FIG. 16 shows Detail D, an enlarged view of a section of the first end 54 of the bi-directional adapter 50 engaged with the threaded neck 120 of a paint bottle. The orifice 122 of the threaded neck 120 contacts the V-shaped groove 64 of the bi-directional adapter 50 and is flexed outward slightly creating a secure seal.

Figure 17:
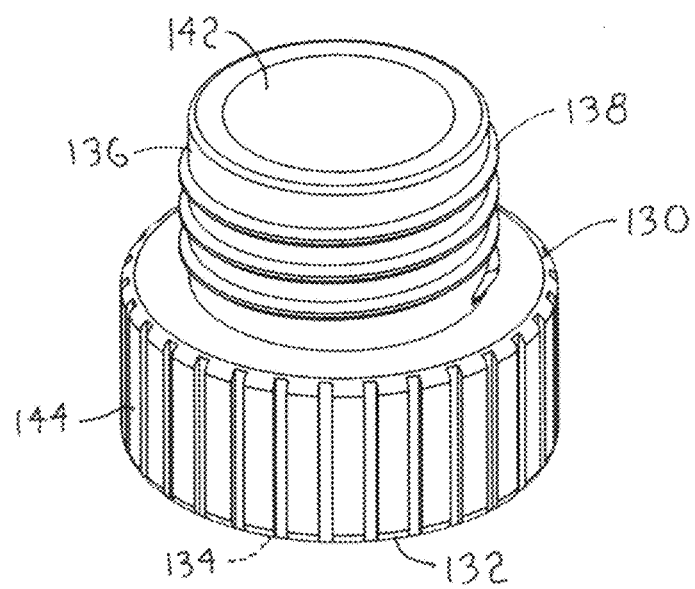
FIG. 17 is an isometric illustration of a bottle adapter, in accordance with the present invention.

FIG. 17 is an isometric illustration of a bottle adapter 130 configured to mate with a paint container or bottle, such as, for example, a paint bottle manufactured and sold under the Art Minds brand. The bottle adapter 130 is a substantially cylindrical body having an adapter base 132 with internal female threads 134 (not shown), and an adapter mesa 136 with male port threads 138 configured to mate with the roller liquid compound applicator 10 (shown in FIG. 1). In the configuration shown, the diameter of the adapter mesa 136 is smaller than the diameter of the adapter base 132 so as to accommodate a wider bottle neck than is compatible with the bi-directional adapter 50 of FIG. 4. Finger grips 144 on the adapter base 132 improve the grip of a user on the bottle adapter 130.

Figure 18:
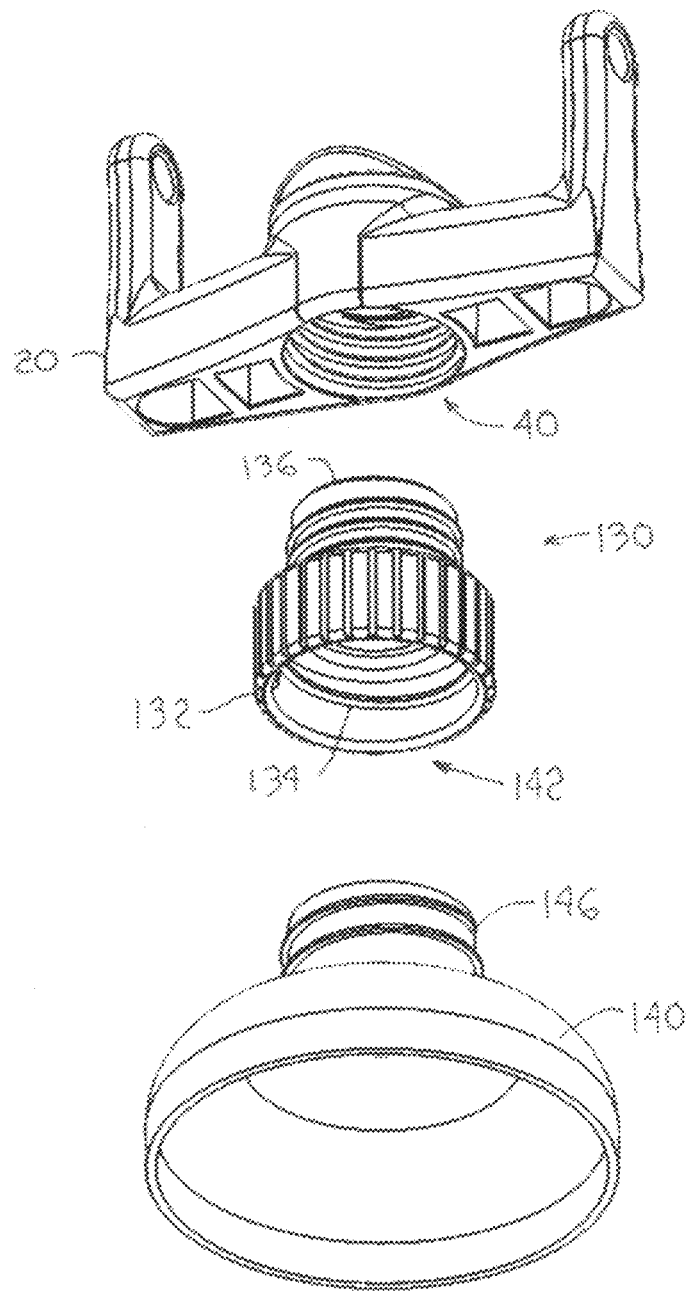
FIG. 18 is an exploded perspective illustration of a threaded neck of a paint bottle, the bottle adapter of FIG. 17, and the roller support frame of FIG. 2.

An adapter opening 142 passing through the bottle adapter 130 serves as a transfer channel for paint, or other liquid, to pass through the adapter base 132, and through the adapter mesa 136, into the threaded cavity 40 of the roller support frame 20, as shown in the exploded components view of FIG. 18. The internal female threads 134 in the adapter base 132 thread onto external male threads 146 on the threaded bottle neck 144 of a paint container, or paint bottle 140.

Figure 19:
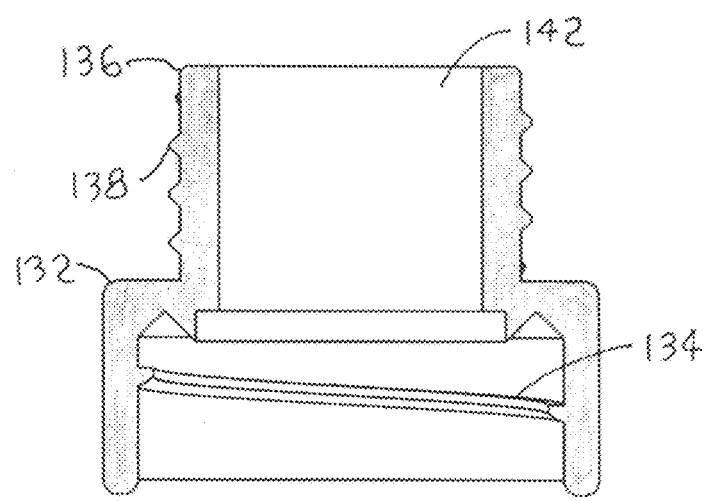
FIG. 19 is a side cross-sectional view of the bottle adapter in FIG. 17.

FIG. 19 is a cross-sectional view of the bottle adapter 130, showing the adapter opening 142 passing through the adapter mesa 136 and through the adapter base 132. The male port threads 138 extend essentially the entire height of the adapter mesa 136, and the internal female threads 134 extend essentially the entire height of the adapter base 132. In an exemplary embodiment, the male port threads 138 are configured in a 3.175 mm pitch, having about 3.5 turns or revolutions on the adapter mesa 136, and having an inner diameter of about 22.0 mm. The internal female threads 134 may have about a 4.67 mm pitch, with about 1.5 turns or revolutions inside the adapter base 132, and an outer diameter of about 28.5 mm.

Figure 20:
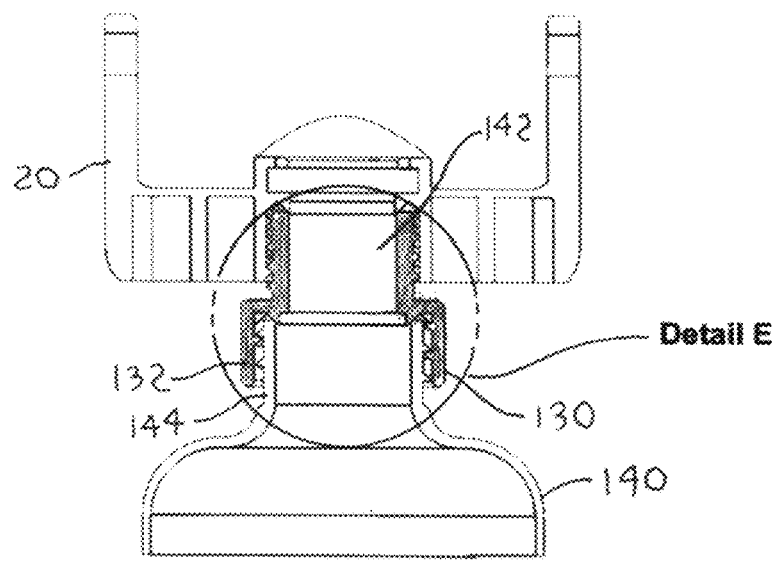
FIG. 20 is a side cross-sectional illustration of the bottle adapter of FIG. 17 assembled to a threaded supply bottle, and to the roller support frame of FIG. 2.
Figure 21:
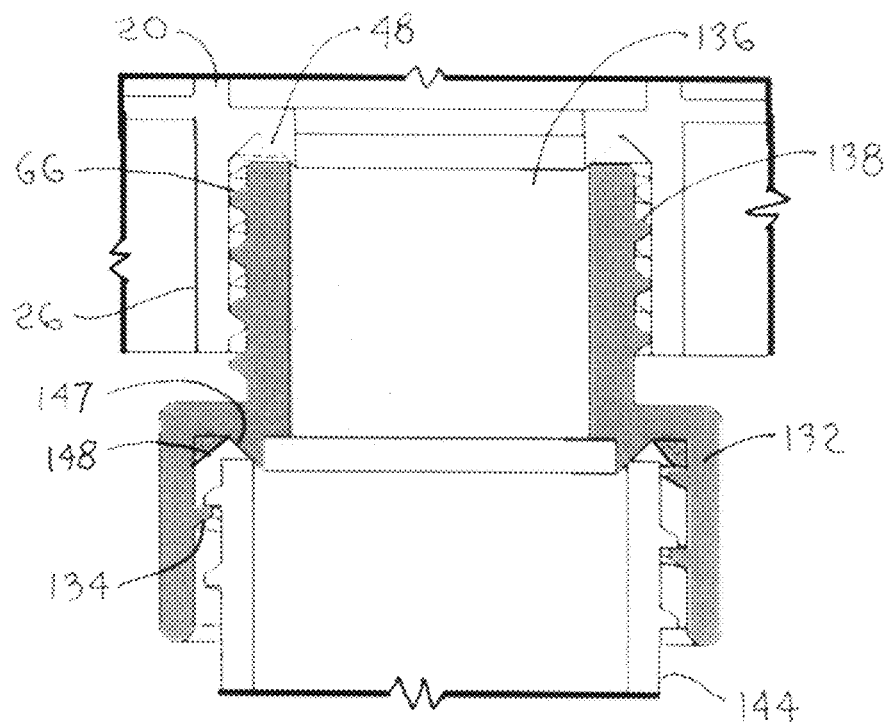
FIG. 21 is a detail view of an adapter mesa in a cross-section illustration of the assembled adapter, supply bottle, and roller support frame of FIG. 20.

FIG. 20 is a front cross-sectional view of the bottle adapter 130 installed into the roller support frame 20 and attached to the paint bottle 140. The adapter base 132 is threaded onto the threaded bottle neck 144. The path of fluid flow from the bottle 140, through the bottle adapter 130 and adapter opening 142, and into the roller support frame 20 can be seen. In particular, as shown in the detail view of FIG. 21, the male port threads 138 bear against the internal threads 66 to produce an engagement of the adapter mesa 136 with the circumferential groove 48 in the dispenser coupling cap 26, and to form a seal preventing fluid leakage between the bottle adapter 130 and the roller support frame 20. An inside conical surface 147 of an internal bottle adapter cylindrical V-shaped groove 148 bears against the threaded bottle neck 144 as tightening of the adapter base 132 onto the threaded bottle neck 144 forces the internal female threads 134 against the external male threads 146 to create a seal against fluid leakage between the bottle adapter 130 and the paint bottle 140 (not shown).

Figure 22:
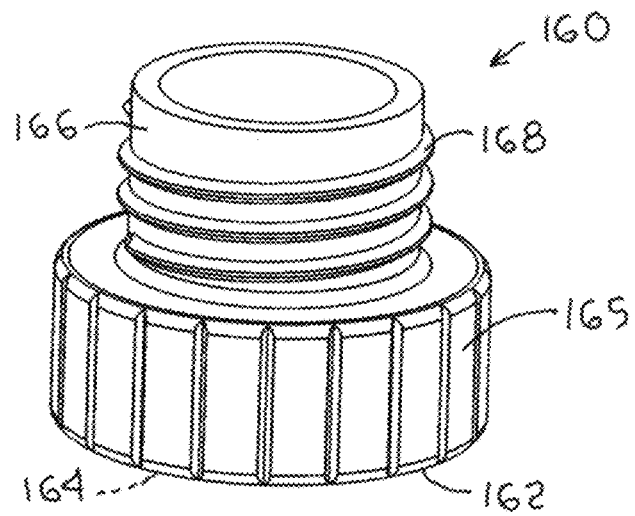
FIG. 22 is an isometric perspective illustration of a hose adapter, in accordance with the present invention.

FIG. 22 is an isometric illustration of a component suitable as a hose adapter 160 configured to mate with a conventional garden hose. The hose adapter 160 can be used under low water pressure from a standard commercial garden hose in order to aid in the cleaning of compatible paint applicators, such as the liquid transfer roller assembly 12. The hose adapter 160 includes an adapter base 162 with internal female threads 164 (not shown), and an adapter mesa 166 with male port threads 168 configured to mate with the roller liquid compound applicator 10 (shown in FIG. 1). The diameter of the adapter mesa 166 is smaller than the diameter of the adapter base 162. Finger grips 165 on the adapter base 162 improve the grip of a user using the hose adapter 160.

Figure 23:
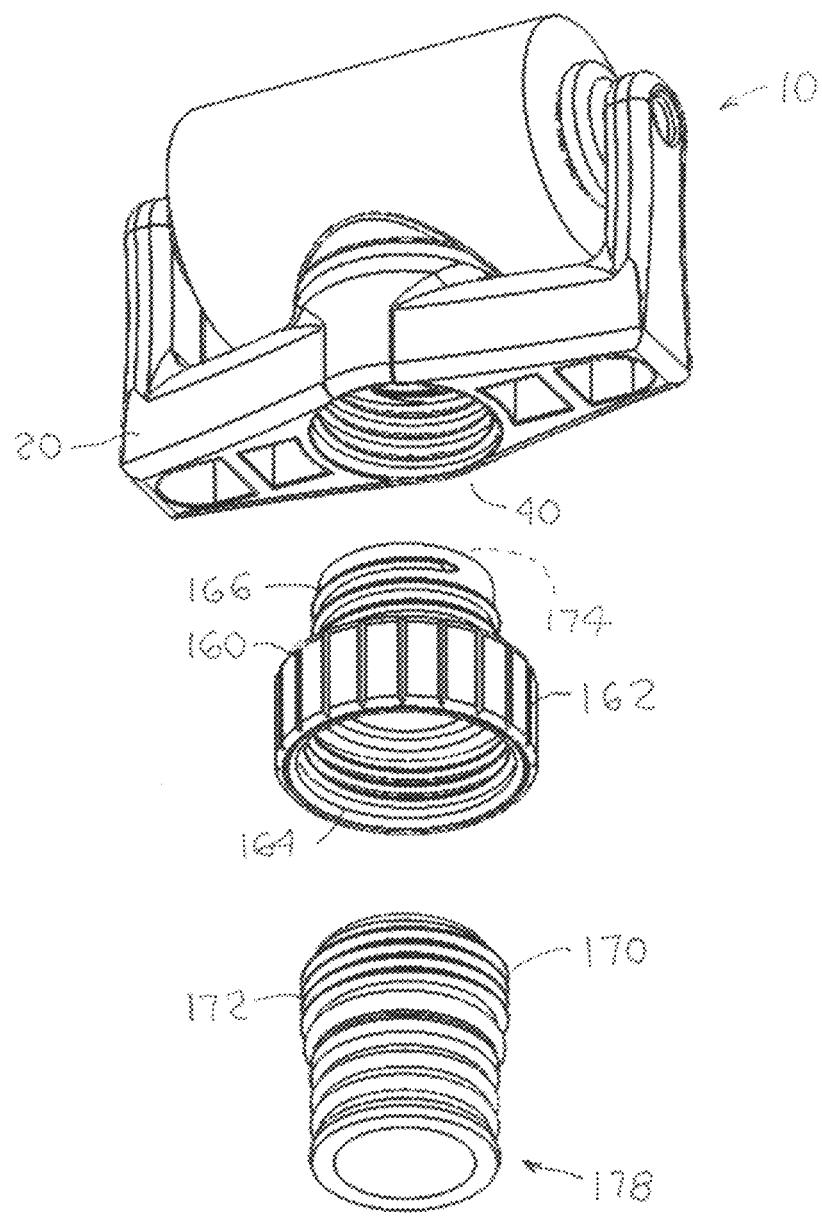
FIG. 23 is an exploded perspective illustration of a threaded male port of a standard garden hose, the hose adapter of FIG. 22, and the roller support frame of FIG. 2.

FIG. 23 is an exploded perspective illustration of the various components: the roller liquid compound applicator 10, the hose adapter 160, and the male port 170 of a standard commercial garden hose 178, arranged in the proper orientation for assembly. A transfer channel 174 passes through the hose adapter 160 and serves as a means to convey water, or a solvent, through the adapter base 162, and through the adapter mesa 166, into the threaded cavity 40 of the roller support frame 20, as shown. The internal female threads 164 in the adapter base 162 thread onto external male threads 172 on the male port 170 of the standard commercial garden hose 178.

Figure 24:
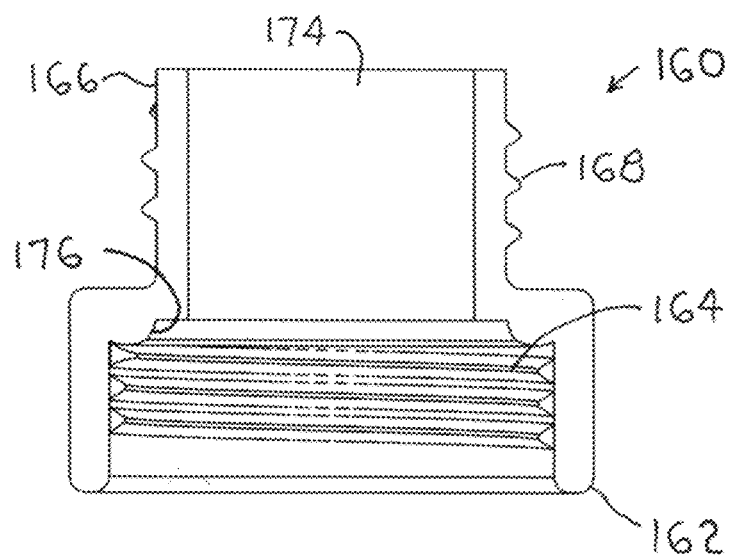
FIG. 24 is a side cross-section illustration of the hose adapter from FIG. 22.

FIG. 24 is a front cross-sectional view of the hose adapter 160, showing the transfer channel 174 passing through the adapter mesa 166 and into the adapter base 162. The male port threads 168 may comprise a 3.175 mm pitch, about 3.5 revolutions, and an inner diameter of about 22.0 mm. The male port threads 168 extend essentially the entire height of the adapter mesa 166, and the internal female threads 164 extend essentially the entire height of the adapter base 162. An internal, substantially circular, rounded flange 176 encloses a lower end of the transfer channel 174 is provided to enable sufficient contact with the male port 170 to act as a seal under low pressure conditions.

The threading of the inner female threads 164 is compatible with standard garden hose threading and extends into the hose adapter 160 to terminate at an end of the transfer channel 174. In an exemplary embodiment, the inner female threads 164 are approximately a 2.10 mm pitch, about 3.0 turns or revolutions, and a 27.0 mm outer diameter. The male port threads 138 may be configured in a 3.175 mm pitch, having about 3.5 turns or revolutions on the adapter mesa 136, and having an inner diameter of about 22.0 mm. The internal female threads 134 may have about a 4.67 mm pitch, with about 1.5 turns or revolutions inside the adapter base 132, and an outer diameter of about 28.5 mm.

Figure 25:
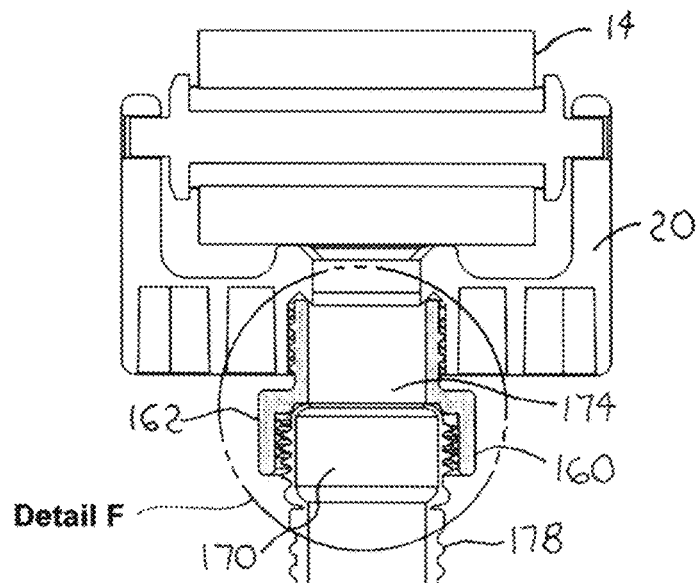
FIG. 25 is a side cross-sectional illustration of the male port, the hose adapter, and the roller support frame, of FIG. 23.
Figure 26:
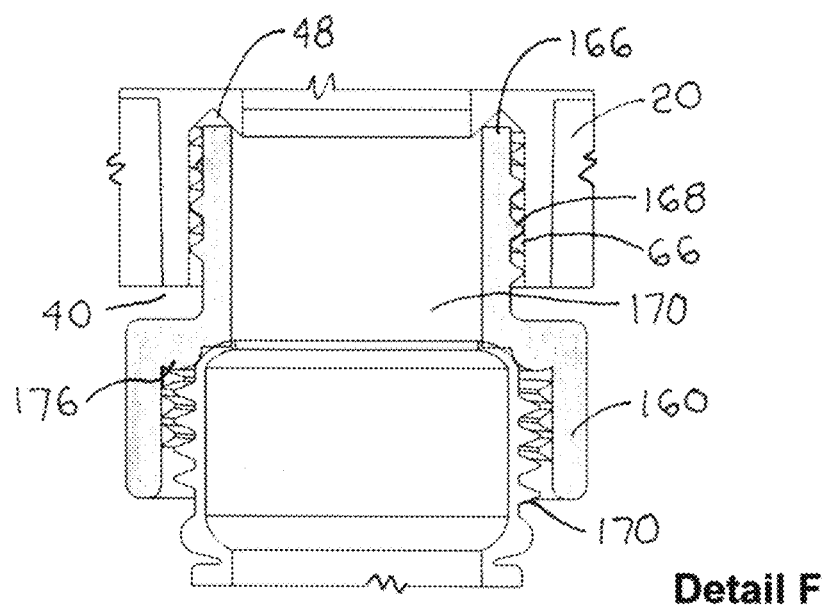
FIG. 26 is a detail view of a rounded flange in the assembled male port, hose adapter, and roller support frame of FIG. 25.

FIG. 25 is a front cross-sectional view of the hose adapter 160 installed into the roller support frame 20 at one end, and attached to the garden hose 178 at the other end. The adapter base 162 is threaded onto the male port 170. The path of fluid flow from the garden hose 178 is through the hose adapter 160 and the transfer channel 174, and onto the roller sleeve 14. In particular, as shown in the Detail F view of FIG. 26, the hose adapter 160 has been threaded into the threaded cavity 40. This view emphasizes the overall interaction between the garden hose 178, the hose adapter 160, and the roller liquid compound applicator 10.

The male port threads 168 bear against the Internal threads 66 to produce an engagement of the adapter mesa 166 with the V-shaped circumferential groove 48 in the dispenser coupling cap 26, and to form a seal preventing fluid leakage between the hose adapter 160 and the roller support frame 20. The internal circular rounded flange 176 bears against the external male threads 172 as tightening of the adapter base 132 onto the threaded bottle neck 144 forces the internal female threads 134 against the male port 170 to create a seal against fluid leakage between the hose adapter 160 and the garden hose 178 (not shown).

It is to be understood that the description herein is only exemplary of the invention, and is intended to provide an overview for the understanding of the nature and character of the disclosed hollow cylindrical threaded adapter. The accompanying drawings are included to provide a further understanding of various features and embodiments of the method and devices of the invention which, together with their description serve to explain the principles and operation of the invention.

What is claimed is:

1. An adapter suitable for attachment to a paint applicator, said adapter comprising:
    a substantially cylindrical body having a fluid channel extending through said cylindrical body;
    a male thread formed on an outer surface of said cylindrical body, said male thread configured for removable attachment to the paint applicator;
    a first female thread extending into said fluid channel from a first end of said cylindrical body;
    a second female thread extending into said fluid channel from a second end of said cylindrical body; and,
    a transfer channel extending between said first female thread and said second female thread so as to form said fluid channel.

2. The adapter of claim 1 wherein said first female thread terminates proximate a first substantially circular V-shaped groove functioning as a first sealing interface, said first substantially circular V-shaped groove disposed to enclose a first end of said transfer channel.

3. The adapter of claim 2 wherein said second female thread terminates proximate a second substantially circular V-shaped groove functioning as a second sealing interface, said second substantially circular V-shaped groove disposed to enclose a second end of said transfer channel.

4. The adapter of claim 1 wherein said first female thread comprises a 1.5 mm pitch, 3.5 turns, and a diameter of approximately 15.0 mm.

5. The adapter of claim 1 wherein said second female thread comprises an approximately 4.0 mm pitch, 2.0 turns, and a diameter of approximately 20.5 mm.

6. The adapter of claim 1 wherein said male thread comprises a 3.175 mm pitch, about 3.5 turns, and a diameter of approximately 22.0 mm.

7. The adapter of claim 1 further comprising a conical bevel formed in said first end of said cylindrical body at one end of said first female thread.

8. The adapter of claim 1 wherein said male thread extends from said first end of said cylindrical body to said second end of said cylindrical body so as to enable either said end of said adapter to be removably attached to the paint applicator.

9. An adapter suitable for attachment to a paint applicator, said adapter comprising:
a substantially cylindrical body having a fluid channel extending through said cylindrical body;
a male thread formed on an outer surface of said cylindrical body, said male thread configured for removable attachment to the paint applicator;
a female thread extending into said fluid channel from a first end of said cylindrical body; and
a transfer channel extending between said female thread and an opening in a second end of said cylindrical body so as to form said fluid channel.

10. The adapter of claim 9 wherein said female thread comprises a 4.67 mm pitch, 1.5 turns, and an approximately 28.5 mm diameter.

11. The adapter of claim 9 wherein said male thread comprises a 3.175 mm pitch, 3.5 turns, and an approximately 22.0 mm diameter.

12. The adapter of claim 9 wherein said female thread terminates proximate a substantially circular V-shaped groove functioning as a sealing interface, said substantially circular V-shaped groove disposed to enclose an end of said transfer channel.

13. The adapter of claim 9 wherein said female thread comprises a pitch of approximately 2.1 mm, 3.0 turns, and an outer diameter of approximately 27.0 mm so as to enable attachment to a garden hose.

14. The adapter of claim 9 wherein said female thread terminates proximate a substantially circular rounded flange functioning as a sealing interface, said substantially circular rounded flange disposed to enclose an end of said transfer channel.

15. The adapter of claim 13 wherein said rounded flange comprises an inner diameter of approximately 20.0 mm and a width of approximately 3.5 mm.

16. A roller liquid compound applicator suitable for use in the application of a liquid compound onto a surface, said applicator comprising:
a U-shaped roller support frame having opposed L-shaped support frame arms connected to a dispenser coupling cap having a first female thread;
a drip guard on said dispenser coupling cap having a concave upper guard surface;
a liquid compound roller sleeve disposed between said opposed L-shaped support frame arms and adjacent to said drip guard; and
an adapter having (i) an external male thread for releasable attachment of said adapter to said first female thread, (ii) a second female thread for releasable attachment to a first threaded bottle, (iii) a third female thread for releasable attachment to a second threaded bottle, and (iv) a transfer channel extending between said second female thread and said third female thread to form a fluid channel extending through said adapter, said fluid channel functioning to enable passage of the liquid compound from one of said threaded bottles to said liquid compound roller sleeve.

17. The roller liquid compound applicator of claim 16 further comprising a substantially circular V-shaped groove disposed in said transfer channel at a terminus of said second female thread.

18. The roller liquid compound applicator of claim 16 further comprising a substantially circular V-shaped groove disposed in said transfer channel at a terminus of said third female thread.

19. The roller liquid compound applicator of claim 18 further comprising a substantially circular V-shaped groove disposed in said transfer channel at a terminus of said second female thread.

20. The roller liquid compound applicator of claim 17 wherein said male thread extends from said first end of said adapter to a second end of said adapter so as to enable either said end of said adapter to be removably attached to said dispenser coupling cap.

* * * * *